United States Patent
Iwamoto et al.

(10) Patent No.: US 9,943,903 B2
(45) Date of Patent: Apr. 17, 2018

(54) BINDER COMPOSITION FOR MAKING SELF-HARDENING FOUNDRY MOLDS, AND METHOD OF PRODUCING FOUNDRY MOLD USING THE SAME

(75) Inventors: Ryoji Iwamoto, Toyohashi (JP); Akira Yoshida, Toyohashi (JP)

(73) Assignee: KAO CORPORATION, Tokyo (JP)

( * ) Notice: Subject to any disclaimer, the term of this patent is extended or adjusted under 35 U.S.C. 154(b) by 1070 days.

(21) Appl. No.: 14/342,183

(22) PCT Filed: Aug. 31, 2012

(86) PCT No.: PCT/JP2012/072159
§ 371 (c)(1),
(2), (4) Date: May 28, 2014

(87) PCT Pub. No.: WO2013/031947
PCT Pub. Date: Mar. 7, 2013

(65) Prior Publication Data
US 2014/0296372 A1    Oct. 2, 2014

(30) Foreign Application Priority Data

Aug. 31, 2011  (JP) ................................ 2011-189265

(51) Int. Cl.
| | |
|---|---|
| *B22C 1/10* | (2006.01) |
| *B22C 1/16* | (2006.01) |
| *C08G 14/02* | (2006.01) |
| *C09J 161/34* | (2006.01) |
| *B22C 1/22* | (2006.01) |
| *B22C 9/02* | (2006.01) |
| *C08K 3/30* | (2006.01) |

(52) U.S. Cl.
CPC ............... *B22C 1/167* (2013.01); *B22C 1/10* (2013.01); *B22C 1/224* (2013.01); *B22C 9/02* (2013.01); *C08G 14/02* (2013.01); *C08K 3/30* (2013.01); *C09J 161/34* (2013.01)

(58) Field of Classification Search
None
See application file for complete search history.

(56) References Cited

U.S. PATENT DOCUMENTS

| | | | | |
|---|---|---|---|---|
| 2,681,896 A | * | 6/1954 | Nielsen .................. | C08G 65/36 524/852 |
| 3,748,156 A | | 7/1973 | Moore, Jr. | |
| 3,752,681 A | | 8/1973 | Moore, Jr. | |
| 3,752,689 A | | 8/1973 | Moore, Jr. | |
| 3,767,458 A | | 10/1973 | Moore, Jr. | |
| 3,860,476 A | | 1/1975 | Moore, Jr. | |
| 3,894,572 A | | 7/1975 | Moore, Jr. | |
| 4,017,461 A | * | 4/1977 | Dunlop ............... | C08G 16/0256 528/249 |
| 4,028,271 A | * | 6/1977 | Schaidle .................. | C08K 3/30 502/168 |
| 4,043,950 A | * | 8/1977 | Wilmsen ................ | C08J 9/0014 252/3 |
| 4,271,054 A | * | 6/1981 | Kim .................... | C08G 16/0262 524/595 |
| 5,177,140 A | * | 1/1993 | Ogawa .................. | B22C 1/2233 524/430 |
| 5,223,554 A | | 6/1993 | Gerber | |
| 5,932,628 A | * | 8/1999 | Kiuchi .................... | B22C 1/224 523/139 |
| 2003/0224165 A1 | | 12/2003 | Anderson et al. | |
| 2011/0073269 A1 | | 3/2011 | Frohn et al. | |

FOREIGN PATENT DOCUMENTS

| | | |
|---|---|---|
| CN | 101508879 A | 8/2009 |
| DE | 833842 C | 3/1952 |
| DE | 102008024727 A1 | 11/2009 |
| EP | 0 934 785 A1 | 8/1999 |
| JP | 48-56520 A | 8/1973 |
| JP | 55-120445 A | 9/1980 |
| JP | 60-250853 A | 12/1985 |
| JP | 6-106295 A | 4/1994 |
| JP | 7-185732 A | 7/1995 |
| JP | 8-57575 A | 3/1996 |

(Continued)

OTHER PUBLICATIONS

Extended European Search Report, dated May 7, 2015, for European Application No. 12826921.4.
PCT/ISA/210—International Search Report dated Nov. 27, 2012, issued in PCT/JP2012/072159.
Chinese Office Action, dated Feb. 28, 2015, for Chinese Application No. 201280042567.4.
International Preliminary Report on Patentability and Written Opinion of the International Searching Authority (Forms PCT/IB/373 and PCT/ISA/237) dated Mar. 13, 2014 for Application No. PCT/JP2012/072159.

(Continued)

*Primary Examiner* — Robert C Boyle
(74) *Attorney, Agent, or Firm* — Birch, Stewart, Kolasch & Birch, LLP

(57) ABSTRACT

The present invention relates to a binder composition for making self-hardening foundry molds that is capable of improving the hardening speed of the molds and the strength of the molds, and is excellent in storage stability; and a method for producing a foundry mold, using this composition. The binder composition for making self-hardening foundry molds of the present invention is a binder composition for making self-hardening foundry molds, comprising a furan resin and an ion compound, wherein the ion compound contains at least one anion selected from the group consisting of a hydrogensulfite ion, a sulfite ion, a pyrosulfite ion, a thiosulfate ion, a thionate ion, and a dithionite ion; the content of the anion is from 0.006 to 0.60 parts by weight for 100 parts by weight of the furan resin; and the composition has a pH of 6 or less at 25° C.

20 Claims, No Drawings

(56) References Cited

FOREIGN PATENT DOCUMENTS

| JP | 2000-246391 A | 9/2000 |
|---|---|---|
| JP | 2010-12475 A | 1/2010 |
| JP | 2010-29905 A | 2/2010 |
| JP | 2011-212746 A | 10/2011 |
| WO | WO 90/02007 A1 | 3/1990 |

OTHER PUBLICATIONS

Wang, "Research on Modification of No-Bake Furan Resin Binders for Casting", Chinese Doctorial Dissertation's & Master's Theses Full-Text Database (Master) Engineering Science and Technology I, Issue 2, Feb. 2007, 28 pages, with an English translation.

* cited by examiner

BINDER COMPOSITION FOR MAKING SELF-HARDENING FOUNDRY MOLDS, AND METHOD OF PRODUCING FOUNDRY MOLD USING THE SAME

FIELD OF THE INVENTION

The present invention relates to a binder composition for making self-hardening foundry molds, and a method for producing a foundry mold, using this composition.

BACKGROUND OF THE INVENTION

As a foundry mold for producing a casting, known are a self-hardening foundry mold, a heat-hardening foundry mold, a gas-hardening foundry mold, and others. The self-hardening foundry mold, which has been most frequently used, is obtained by: adding, to refractory particles such as silica sand, a binder composition for making self-hardening foundry molds containing a furan resin and others, and a hardener including phosphoric acid, an organic sulfonic acid, sulfuric acid or some other acid; mixing these components; and then filling the resultant mixed sand composition into an original pattern such as a wooden pattern.

As the furan resin, for example, the following is used: furfuryl alcohol, condensate made from furfuryl alcohol, furfuryl alcohol/urea formaldehyde resin, furfuryl alcohol/formaldehyde resin, furfuryl alcohol/phenol/formaldehyde resin, or some other known modified furan resin.

WO 90/02007 and JP-A-55-120445 describe, as an additive for a binder composition, an ion compound such as a sulfite salt or a thiosulfate salt.

WO 90/02007 describes that a foundry mold material containing a refractory aggregate and a hardening binder, as main constituent components, in which the hardening binder contains a polyfunctional acrylamide having two or more ethylenically unsaturated groups in the molecule is excellent in low-temperature rapid hardenability, disintegratability and bench life, and is suitable, in particular, as a material for foundry molds for casting a low-melting-point metal such as an aluminum alloy. WO 90/02007 describes that the hardening binder is a polymerizable organic compound having a hardening mechanism different from that of conventional binders, and as a redox catalyst, sulfite salts such as sodium hydrogensulfite, metal soaps such as cobalt naphthenate, and others are used.

JP-A-55-120445 describes a composition for foundry molds that is an acid-hardening resin composition comprising an organic resin hardenable with an acid at normal temperature and a latent hardening agent for the organic resin, in which the latent hardening agent is at least one selected from the group consisting of sulfur compounds which can each form into sulfur trioxide by effect of ozone. JP-A-55-120445 describes, as the latent hardening agent, sulfite salts, hydrogensulfite salts, pyrosulfite salts, hyposulfite salts, aldehyde adducts of hyposulfite salts, thiosulfate salts, and others.

SUMMARY OF THE INVENTION

The binder composition for making self-hardening foundry molds of the present invention is a binder composition for making self-hardening foundry molds, comprising a furan resin and an ion compound, wherein the ion compound contains at least one anion selected from the group consisting of a hydrogensulfite ion, a sulfite ion, a pyrosulfite ion, a thiosulfate ion, a thionate ion, and a dithionite ion; the content of the anion is from 0.006 to 0.60 parts by weight for 100 parts by weight of the furan resin; and the composition has a pH of 6 or less at 25° C.

DETAILED DESCRIPTION OF THE INVENTION

In the foundry mold material described in WO 90/02007, the redox catalyst is neutral or alkaline; thus, in a furan resin type binder composition which is hardened by dehydration condensation reaction with an acid, no hardening reaction is promoted. In the acid-hardening resin composition described in JP-A-55-120445, sulfur trioxide is generated by a continuous supply of ozone. However, in a system into which ozone is not continuously supplied, the hardening reaction of the hardening organic resin is not promoted. As described above, conventional binder compositions for making foundry molds are not sufficiently satisfactory in the hardening speed of the molds or the strength of the molds. Thus, the productivity of foundry molds is desired to be improved.

The present invention relates to a binder composition for making self-hardening foundry molds that is capable of improving the hardening speed of the molds and the strength of the molds, and is excellent in storage stability; and a method for producing a foundry mold, using this composition.

The binder composition for making self-hardening foundry molds of the present invention is a binder composition for making self-hardening foundry molds, comprising a furan resin and an ion compound, wherein the ion compound contains at least one anion selected from the group consisting of a hydrogensulfite ion, a sulfite ion, a pyrosulfite ion, a thiosulfate ion, a thionate ion, and a dithionite ion; the content of the anion is from 0.006 to 0.60 parts by weight for 100 parts by weight of the furan resin; and the composition has a pH of 6 or less at 25° C.

The method for producing a foundry mold of the present invention is a method for producing a foundry mold comprising the step of hardening a mixture containing the binder composition for making self-hardening foundry molds of the present invention, refractory particles, and a hardener.

According to the binder composition for making self-hardening foundry molds of the present invention, the hardening speed and the strength of the molds can be improved. Thus, foundry molds can be stably produced so as to become good in productivity. The binder composition for making self-hardening foundry molds of the present invention is also good in storage stability.

The binder composition for making self-hardening foundry molds (also referred to merely as the "binder composition" hereinafter) of the present invention is a binder composition for making self-hardening foundry molds which comprises a furan resin and an ion compound, wherein the ion compound contains at least one anion selected from the group consisting of a hydrogensulfite ion, a sulfite ion, a pyrosulfite ion, a thiosulfate ion, a thionate ion, and a dithionite ion; the content of the anion is from 0.006 to 0.60 parts by weight for 100 parts by weight of the furan resin; and the composition has a pH of 6 or less at 25° C. The binder composition produces an advantageous effect of improving the hardening speed and the strength of the molds. Although the reason why such advantageous effect is produced is unclear, the reason would be as follows.

When the ion compound used in the present invention, which contains an anion such as a hydrogensulfite ion, a sulfite ion, a pyrosulfite ion, a thiosulfate ion, a thionate ion or a dithionite ion, is present together with sulfuric acid or some other hardener, an acid having a lower pKa than that of sulfuric acid or the other hardener is generated to give high acid strength, thereby promoting the hardening.

Hereinafter, the binder composition of the present invention will be described. The binder composition of the present invention contains a furan resin and an ion compound.

<Ion Compound>

The ion compound in the present invention is an ion compound containing one or more anion selected from the group consisting of a hydrogensulfite ion, a sulfite ion, a pyrosulfite ion, a thiosulfate ion, a thionate ion, and a dithionite ion.

The anion-containing ion compound in the present invention is added into the binder composition preferably in the form of a salt thereof with a cation. A hydrogensulfite ion compound may be an acidic salt of sulfurous acid; a sulfite ion compound may be a salt of sulfurous acid; a pyrosulfite ion compound may be a salt of pyrosulfurous acid; a thiosulfate ion compound may be a salt of thiosulfuric acid; a thionate ion compound may be a salt of tetrathionic acid; and a dithionite ion compound may be a salt of dithionic acid. From the viewpoint of an improvement in the mold hardening speed and the mold strength, the anion is preferably a thiosulfate ion, a hydrogensulfite ion, or a sulfite ion, more preferably a thiosulfate ion or a hydrogensulfite ion, even more preferably a thiosulfate ion.

When a salt is used as the ion compound, a cation in the ion compound may be a metal cation. The metal cation may be a monovalent, bivalent, trivalent or higher-valent metal. From the viewpoint an improvement in the storage stability of the binder composition, a bivalent or lower-valent metal is preferred, and a monovalent metal is more preferred.

From the viewpoint of an improvement in the mold hardening speed and the mold strength, the cation in the ion compound of the present invention is preferably a cation (metal ion) of one or more elements selected from the group consisting of elements in Groups 1, 2 and 12 of the periodic table; more preferably a cation of one or more elements selected from the group consisting of elements in Groups 1 and 2 of the periodic table; and even more preferably a cation of one or more elements selected from the group consisting of elements in Group 1 of the periodic table. From the same viewpoint, in the Group 1 of the periodic table, Na ion and K ion are preferred, and Na ion is more preferred. From the same viewpoint, in the Group 2 of the periodic table, Mg ion and Ca ion are preferred, and in the Group 12 of the periodic table, Zn ion is preferred. From the same viewpoint, in the elements in the Groups 1, 2 and 12 of the periodic table, preferred are Na ion, K ion, Mg ion, Ca ion, and Zn ion, and more preferred are Na ion and K ion. Even more preferred is Na ion.

Specific examples of the salt of hydrogensulfite ion ($HSO_3^-$) include sodium hydrogensulfite, potassium hydrogensulfite, lithium hydrogensulfite, magnesium hydrogensulfite, calcium hydrogensulfite, and zinc hydrogensulfite.

Specific examples of the salt of sulfite ion ($SO_3^{2-}$) include sodium sulfite (anhydride or heptahydrate), potassium sulfite, lithium sulfite, magnesium sulfite (hexahydrate), calcium sulfite (½ hydrate), zinc sulfite (dihydrate), barium sulfite, bismuth sulfite, and silver sulfite.

Specific examples of the salt of pyrosulfite ion ($S_2O_5^{2-}$) include sodium pyrosulfite, potassium pyrosulfite, magnesium pyrosulfite, calcium pyrosulfite, and zinc pyrosulfite.

Specific examples of the salt of thiosulfate ion ($S_2O_3^{2-}$) include sodium thiosulfate (anhydride or pentahydrate), potassium thiosulfate, barium thiosulfate (monohydrate), magnesium thiosulfate (hexahydrate), calcium thiosulfate, and zinc thiosulfate.

Specific examples of the salt of thionate ion ($S_xO_6^{2-}$) include sodium tetrathionate (dihydrate), potassium tetrathionate, magnesium terathionate, calcium tetrathionate, and zinc terathionate.

Specific examples of the salt of dithionite ion ($S_2O_4^{2-}$) include sodium dithionite, potassium dithionite, magnesium dithionite, calcium dithionite, and zinc dithionite.

From the viewpoint of an improvement in the mold hardening speed and an improvement in the mold strength, among these ion compounds, preferred are sodium hydrogensulfite, potassium hydrogensulfite, sodium sulfite, sodium thiosulfate, potassium thiosulfate, magnesium thiosulfate, calcium thiosulfate, sodium tetrathionate, and sodium dithionite; more preferred are sodium hydrogensulfite, potassium hydrogensulfite, sodium sulfite, sodium thiosulfate, potassium thiosulfate, magnesium thiosulfate, and calcium thiosulfate; even more preferred are sodium thiosulfate, potassium thiosulfate, magnesium thiosulfate, and calcium thiosulfate; and even more preferred is sodium thiosulfate.

About the measurement of the content of the anion in the ion compound, each of the hydrogensulfite ion, the sulfite ion, the pyrosulfite ion, the thiosulfate ion, the thionate ion, and the dithionite ion can be quantitatively determined by ion chromatographic analysis or elementary analysis. Alkali metals and others in these salts can be qualitatively or quantitatively determined by ICP atomic emission spectrometry.

Examples of the method for the mixing of the ion compound include a method of mixing the ion compound with the furan resin and other components; and a method of mixing the furan resin into which the ion compound is beforehand incorporated with other components. The method for incorporating the ion compound beforehand into the furan resin include a method of mixing the ion compound with starting monomers before the synthesis reaction, and then attaining the synthesis; a method of mixing, during the synthesis reaction, the ion compound with the monomers; and a method of mixing, after the synthesis, the ion compound with the resin. The method may be a method of mixing an acid containing the anion, i.e., sulfurous acid, thiosulfuric acid, dithionic acid or some other acid, and neutralizing the resultant liquid to produce the ion compound in the binder composition or the furan resin. From the viewpoint of reducing accidental errors of the added amounts, it is preferred to perform the mixing when the binder composition is produced. From the viewpoint of easiness of the production, it is preferred to perform the mixing after the ion compound is dissolved into a solvent to prepare a solution. The solvent is preferably water from the viewpoint of dissolving-performance.

From the viewpoint of an improvement in the mold hardening speed and an improvement in the mold strength, in the ion compound related to the present invention, the anion content is 0.006 parts or more by weight, preferably 0.009 parts or more by weight, more preferably 0.02 parts or more by weight, even more preferably 0.03 parts or more by weight for 100 parts by weight of the furan resin. From the viewpoint of the storage stability of the binder composition, the anion content is 0.60 parts or less by weight for 100 parts by weight of the furan resin. From the viewpoint of an improvement in the mold hardening speed and an improvement in the mold strength, furthermore, the anion content is 0.60 parts or less by weight, preferably 0.50 parts or less by weight, more preferably 0.20 parts or less by weight, even more preferably 0.10 parts or less by weight for 100 parts by weight of the furan resin. When these viewpoints are synthesized, the content of the anion content of the present invention to be blended is from 0.006 to 0.60 parts by weight, preferably from 0.009 to 0.50 parts by weight, more preferably from 0.02 to 0.20 parts by weight, even more preferably from 0.03 to 0.10 parts by weight for 100 parts by weight of the furan resin. About the furan resin, the amount thereof is defined based on the furan resin from which water is excluded (furan resin effective content).

From the viewpoint of an improvement in the mold hardening speed and an improvement in the mold strength, in the ion compound related to the present invention, the anion content by percentage in the binder composition is preferably 0.006% or more by weight, more preferably 0.008% or more by weight, even more preferably 0.03% or more by weight, even more preferably 0.05% or more by weight. From the viewpoint of the storage stability of the binder composition, the anion content by percentage is preferably 0.54% or less by weight. From the viewpoint of an improvement in the mold hardening speed and an improvement in the mold strength, furthermore, the anion content by percentage is more preferably 0.50% or less by weight, even more preferably 0.40% or less by weight, even more preferably 0.20% or less by weight. When these viewpoints are synthesized, the content by percentage of the anion related to the present invention in the binder composition is preferably from 0.006 to 0.54% by weight, more preferably from 0.008 to 0.50% by weight, even more preferably from 0.03 to 0.40% by weight, even more preferably from 0.05 to 0.20% by weight.

The content by percentage of the ion compound related to the present invention in the binder composition is preferably from 0.005 to 2.0% by weight, more preferably from 0.01 to 1.0% by weight from the viewpoint of the storage stability of the binder composition, and improvements in the mold hardening speed and the mold strength.

<Furan Resin>

As the furan resin, a resin known in the prior art may be used. The furan resin may be, for example, a resin comprising one selected from the group consisting of furfuryl alcohol, a condensate made from furfuryl alcohol, a condensate made from furfuryl alcohol and an aldehyde, and a condensate made from furfuryl alcohol, an aldehyde and urea; or a resin comprising a mixture of two or more selected from this group. The furan resin may be made from a co-condensate comprising two or more selected from the group, or a mixture of one or more selected from the group, and the co-condensate. The furan resin may contain a material comprising one selected from the group consisting of a condensate made from a phenolic compound and an aldehyde, a condensate made from melamine and an aldehyde, and a condensate made from urea and an aldehyde. Furthermore, a material obtained by co-condensing one or more of the above-mentioned furan resins with such a condensate may be used.

Examples of any one of all the aldehydes include formaldehyde, acetaldehyde, glyoxal, glutaraldehyde, furfural, and terephthalaldehyde. One or more out of these are usable. From the viewpoint of an improvement in the mold strength, formaldehyde is preferred. From the viewpoint of a decrease in the amount of formaldehyde generated at the time of molding of the mold, furfural and terephthalaldehyde are preferred.

Examples of the phenolic compound include phenol, cresol, resorcin, bisphenol A, bisphenol C, bisphenol E, and bisphenol F. One or more out of these are usable.

From the viewpoint of an improvement in the mold strength, the pH of the furan resin at 25° C. is preferably less than 7, more preferably 6 or less, even more preferably 5.5 or less, even more preferably 5 or less. From the viewpoint of the storage stability, the pH is preferably 1.9 or more, more preferably 2.5 or more, even more preferably 3 or more. When these viewpoints are synthesized, the pH of the furan resin at 25° C. is preferably from 1.9 to 6, more preferably from 2.5 to 5.5, even more preferably from 3 to 5. When the furan resin is an acidic furan resin, the resin is preferably a resin synthesized, using an acidic catalyst.

The acidic catalyst used when the furan resin used in the present invention is synthesized is preferably an acidic catalyst having a pKa of 5.0 or less from the viewpoint of an improvement in the mold hardening speed and an improvement in the mold strength.

The acidic catalyst may be an inorganic acid such as sulfuric acid (pKa: 1.99) or phosphoric acid (pKa: 2.1); a sulfonic acid such as benzenesulfonic acid (pKa: −2.5), p-toluenesulfonic acid (pKa: −2.8), xylenesulfonic acid (pKa: −2.6), or methanesulfonic acid (pKa: −2.0); or an organic carboxylic acid such as tartaric acid (pKa: 3.95), citric acid (pKa: 2.87), malic acid (pKa: 3.24), glycolic acid (pKa: 3.63), lactic acid (pKa: 3.66), benzoic acid (pKa: 4.20), or formic acid (pKa: 3.55). From the viewpoint of an improvement in the mold hardening speed and an improvement in the mold strength, benzoic acid and formic acid are preferred. About these acidic catalysts, the pKa is preferably from 1.9 to 5.0, more preferably from 3.0 to 4.5 from the viewpoint of an improvement in the mold hardening speed, an improvement in the mold strength, and safety at the time of the production.

The resultant furan resin may be used as it is in an acidic state. If necessary, the resin may be neutralized. When the furan resin is neutralized and then the neutralized resin is again made acidic, a carboxylic acid such as glycolic acid or benzoic acid may be added thereto to give a predetermined pH.

When the furan resin is produced, the ratio by mole of the monomers to the acidic catalyst is as follows from the viewpoint of an improvement in the mold strength and shortening in the period for the production: the ratio of the whole of the monomers:acidic catalyst is from 1:0.0001 to 1:1.0, more preferably from 1:0.0005 to 1:0.1, even more preferably from 1:0.001 to 1:0.05.

As the monomers, the following are usable: furfuryl alcohol, urea, the aldehyde, and the phenolic compound. The ratio by mole therebetween is appropriately adjustable.

In the case of producing a condensate made from furfuryl alcohol, an aldehyde and urea, it is preferred from the viewpoint of an improvement in the mold strength to use 0.05 to 3 mol of the aldehyde and 0.03 to 1.5 mol of urea per 1 mole of furfuryl alcohol. From the same viewpoint, the aldehyde is preferably formaldehyde.

The nitrogen content by percentage in the furan resin is preferably from 0.8 to 6.0% by weight, more preferably from 1.8 to 5.0% by weight, even more preferably from 2.0 to 4.0% by weight from the viewpoint of an improvement in the mold strength.

The content by percentage of free furfuryl alcohol in the furan resin is preferably from 20 to 98% by weight, more preferably from 20 to 95% by weight, even more preferably from 20 to 80% by weight, even more preferably from 30 to 75% by weight of the composition which is in the state of containing water from the viewpoint of easiness of the handling. When the water content by percentage that will be described later is from 10 to 20% by weight, the content by percentage of the free furfuryl alcohol is more preferably form 35 to 85% by weight, more preferably from 35 to 65% by weight.

The content by percentage of furfuryl alcohol in the binder composition is preferably 20% or more by weight, more preferably 45% or more by weight, even more preferably 60% or more by weight, even more preferably 70% or more by weight from the viewpoint of an improvement in the mold strength. From the viewpoint of a decrease in flammability, the content by percentage of the furfuryl alcohol in the binder composition is preferably 98% or less by weight, more preferably 95% or less by weight, even more preferably 90% or less by weight. From the viewpoint of an improvement in the mold strength and a decrease in the flammability, the content by percentage of furfuryl alcohol in the binder composition is preferably from 20 to 98% by weight, more preferably from 45 to 95% by weight, even more preferably from 60 to 90% by weight, even more preferably from 70 to 90% by weight.

The furan resin preferably has a viscosity of 5.5 to 50 mPa·s at 25° C. from the viewpoint of not damaging the fluidity of the mixed sand composition.

In the case of synthesizing various condensates, such as a condensate made from furfuryl alcohol and an aldehyde, the condensates are usually obtained in the form of a mixture with water since a raw material in an aqueous solution form is used or condensation water is produced. When such a condensate is used for the furan resin, it is unnecessary to remove the water, which originates from the synthesis process, intentionally. In other words, the furan resin may contain water from the viewpoint of convenience of the production, and easiness of the handling thereof. The water content by percentage in the furan resin is preferably 30% or less by weight, more preferably 25% or less by weight, even more preferably 20% or less by weight from the viewpoint of an improvement in the mold hardening speed. From the viewpoint of not allowing the furan resin to have flammability, nor allowing the furan resin to be classified into dangerous objects, the water content by percentage is preferably 3.0% or more by weight, more preferably more than 6.0% by weight, even more preferably 10% or more by weight. When these viewpoints are synthesized, the water content by percentage in the furan resin is preferably from 3.0 to 30% by weight, more preferably from more than 6.0 to 30% by weight, even more preferably from more than 6.0 to 25% by weight, even more preferably from 10 to 20% by weight. When the relationship about weight between the furan resin and any other compound is referred to in the present invention, the amount of the furan resin is based on the amount of the furan resin from which water is excluded (furan resin effective content).

The content by percentage of the furan resin (furan resin effective content) in the binder composition is preferably 50% or more by weight, more preferably 55% or more by weight, even more preferably 60% or more by weight, even more preferably 70% or more by weight from the viewpoint of exhibiting the mold strength sufficiently. The content by percentage of the furan resin (furan resin effective content) in the binder composition is preferably 99% or less by weight, more preferably 95% or less by weight, more preferably 90% or less by weight from the viewpoint of a decrease in the flammability. From the viewpoint of exhibiting the mold strength sufficiently and a decrease in the flammability, the content by percentage of the furan resin (furan resin effective content) in the binder composition is preferably from 50 to 99% by weight, more preferably from 55 to 95% by weight, even more preferably from 60 to 90% by weight, even more preferably from 70 to 90% by weight.

The binder composition of the present invention may further contain a hardening promoter, water and/or other additives.

<Hardening Promoter>

The binder composition of the present invention may contain a hardening promoter from the viewpoint of the prevention of the cracking of the mold, and an improvement in final mold strength. From the viewpoint of the improvement in the final mold strength, the hardening promoter is preferably one or more selected from the group consisting of compounds each represented by a general formula (I) illustrated below (hereinafter, the compounds are each referred to as the hardening promoter (1)), phenol derivatives, and aromatic dialdehydes.

[Formula 1]

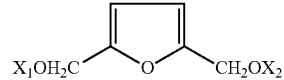

(1)

wherein $X_1$ and $X_2$ each represent a hydrogen atom $CH_3$, or $C_2H_5$.

Examples of the hardening promoter (1) include 2,5-bishydroxymethylfuran, 2,5-bismethoxymethylfuran, 2,5-bisethoxymethylfuran, 2-hydroxymethyl-5-methoxymethylfuran, 2-hydroxymethyl-5-ethoxymethylfuran, and 2-methoxymethyl-5-ethoxymethylfuran. Of these examples, 2,5-bishydroxymethylfuran is preferably used from the viewpoint of an improvement in the final mold strength. The content by percentage of the hardening promoter (1) in the binder composition is preferably from 0.5 to 53% by weight, more preferably from 1.8 to 50% by weight, even more preferably from 2.5 to 40% by weight, even more preferably from 3.0 to 30% by weight from the viewpoint of the solubility of the hardening promoter (1) in the furan resin, and an improvement in the final mold strength.

Examples of the phenol derivative include resorcin, cresol, hydroquinone, phloroglucinol, andmethylenebisphenol. Resorcin is particularly preferred from the viewpoint of an improvement in the final mold strength. The content by percentage of the phenol derivative in the binder composition is preferably from 1 to 25% by weight, more preferably from 2 to 15% by weight, even more preferably from 3 to 10% by weight from the viewpoint of the solubility of the phenol derivative in the furan resin and an improvement in the final mold strength. In the case of using, among the derivatives, resorcin, the resorcin content by percentage in the binder composition is preferably from 1 to 10% by weight, more preferably from 2 to 7% by weight, even more preferably from 3 to 6% by weight from the viewpoint of the solubility of resorcin in the furan resin and an improvement in the final mold strength.

Examples of the aromatic dialdehyde include terephthalaldehyde, phthalaldehyde and isophthalaldehyde; and derivatives thereof. The derivatives thereof denote, for example, aromatic compounds each having, as a basic structure, an aromatic ring having two formyl groups, and a substituent, such as an alkyl group, bonded to the aromatic ring. From the viewpoint of preventing the mold from being cracked, preferred are terephthalaldehyde and a derivative of terephthalaldehyde, and more preferred is terephthalaldehyde. The content by percentage of the aromatic dialdehyde in the binder composition is preferably from 0.1 to 15% by weight, more preferably from 0.5 to 10% by weight, even more preferably from 1 to 5% by weight from the viewpoint of dissolving the aromatic dialdehyde sufficiently into the furan resin and restraining smell of the aromatic dialdehyde itself.

<Water>

The binder composition of the present invention may further contain water. Since the furan resin may contain water as described above, the binder composition of the present invention may contain water originating from the water. From this viewpoint, the water content by percentage in the binder composition is preferably 3.0% or more by weight. For the purpose of, for example, the adjustment of the binder composition into an easily handleable viscosity, water may be further added thereto. However, if the water content becomes excessive, it is feared that the hardening reaction of the furan resin may be hindered. Thus, the water content by percentage in the binder composition is preferably 30.0% or less by weight, more preferably 25.0% or less by weight, even more preferably 20.0% or less by weight. From the viewpoint of not allowing the binder composition to have flammability, nor allowing the binder composition to be classified into dangerous objects, the water content by percentage is preferably more than 6.0% by weight, more preferably 10% or more by weight, even more preferably 15% or more by weight, even more preferably 20% or more by weight. When these viewpoints are synthesized, the water content by percentage in the binder composition is preferably from 3.0 to 30.0% both inclusive by weight, more preferably more than 6.0% by weight and 30.0% or less by weight, even more preferably more than 6.0% by weight and 25.0% or less by weight, even more preferably from 10.0 to 25.0% by weight, even more preferably from 10.0 to 20.0% by weight. From the viewpoint of an improvement in the mold strength, the water content by percentage is preferably from 3 to 15% by weight, more preferably from 3 to 10% by weight.

<Other Additives>

The binder composition of the present invention may contain therein additives such as a silane coupling agent from the viewpoint of an improvement in the mold strength. Examples of the silane coupling agent include aminosilanes such as N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, and 3-aminopropyltrimethoxysilane; epoxysilanes such as 3-glycidoxypropyltrimethoxysilane, 3-glycidoxypropyltriethoxysilane, 3-glycidoxypropylmethyldiethoxysilane, and 3-glycidoxypropyltriethoxysilane; and ureidosilanes, mercaptosilanes, sulfidesilanes, methacryloxysilanes, and acryloxysilanes. Preferred are aminosilanes, epoxysilanes, and ureidosilanes. The content by percentage of the silane coupling agent in the binder composition is preferably from 0.01 to 0.5% by weight, more preferably from 0.05 to 0.3% by weight from the viewpoint of an improvement in the mold strength.

The nitrogen content by percentage in the binder composition is preferably from 0.6 to 5.0% by weight, more preferably from 1.5 to 4.2% by weight, even more preferably from 1.6 to 3.4% by weight from the viewpoint of an improvement in the mold strength.

The pH of the binder composition at 25° C. is 6 or less, preferably 5.8 or less, more preferably 5.6 or less from the viewpoint of an improvement in the mold strength. From the viewpoint of the storage stability, the pH is preferably 2 or more, more preferably 3 or more, even more preferably 4 or more. When these viewpoints are synthesized, the pH of the furan resin at 25° C. is preferably from 2 to 6, more preferably from 3 to 5.8, even more preferably from 4 to 5.6. The pH of the binder composition is adjustable to a predetermined pH by use of an inorganic acid such as sulfuric acid, a carboxylic acid such as glycolic acid or benzoic acid, or an alkali such as sodium hydroxide. The pH of the furan resin or the binder composition of the present invention is a value obtained by making a measurement at 25° C. about a material obtained by mixing the furan resin or the binder composition with water at a ratio by weight of 50/50 and then stirring the mixture.

The binder composition of the present invention is suitable for a method for producing a foundry mold, including the steps of mixing a binder composition for making self-hardening foundry molds, refractory particles, and an acidic hardener with each other to yield a composition for making self-hardening foundry molds, and hardening the mixture. In other words, the method for producing a foundry mold of the present invention is a foundry-mold-producing method in which the binder composition of the present invention is used as a binder composition for making self-hardening foundry molds.

In the method for producing a foundry mold of the present invention, a foundry mold can be produced, using a process for a conventional method for producing a foundry mold as it is. For example, the binder composition of the present invention and a hardener for hardening this binder composition are added to refractory particles, and then these components are mixed in a batch mixer, a continuous mixer, or some other. This process makes it possible to yield a mixture (mixed sand composition) as described above. In the method for producing a foundry mold of the present invention, it is preferred from the viewpoint of an improvement in the mold strength to add the hardener to the refractory particles, and subsequently add, to the resultant mixture, the binder composition of the present invention.

The refractory particles may be particles known in the prior art, such as silica sand, chromite sand, zircon sand, olivine sand, alumina and, mullite sand, or synthetic mullite sand. Those obtained by collecting used refractory particles, reclaimed sand, which has been subjected to reclaiming treatment, or some other may be used.

The compound contained in the hardener may be one or more materials known in the prior art, such as acidic aqueous solutions containing, for example, a sulfonic acid compound such as xylenesulfonic acid (in particular, m-xylenesulfonic acid), toluenesulfonic acid (in particular, p-toluenesulfonic acid) or methanesulfonic acid, a phosphoric acid compound such as phosphoric acid or an acidic phosphate, sulfuric acid, or some other. Further, it is allowable to incorporate, into the hardener, one or more solvents selected from the group consisting of alcohols, ether alcohols and esters, and/or a carboxylic acid. Of these compounds, alcohols and ether alcohols are preferred, and ether alcohols are more preferred from the viewpoint of an improvement in the final mold strength. When the solvent(s) and/or the carboxylic acid is/are incorporated, the water content by percentage in the hardener is decreased so that the final mold strength is further improved. The content by percentage of the solvent(s) and/or the carboxylic acid is preferably from 5 to 50% by weight, more preferably from 10 to 40% by weight from the viewpoint of an improvement in the final mold strength. It is preferred from the viewpoint of decreasing the viscosity of the hardener to incorporate methanol or ethanol thereinto.

From the viewpoint of an improvement in the mold strength, the alcohols are preferably propanol, butanol, pentanol, hexanol, heptanol, octanol and benzyl alcohol; the ether alcohols are preferably ethylene glycol monoethyl ether, ethylene glycol monobutyl ether, ethylene glycol monohexyl ether, diethylene glycol monoethyl ether, diethylene glycol monobutyl ether, diethylene glycol monohexyl ether, diethylene glycol monophenyl ether and ethylene glycol monophenyl ether; and the ester are preferably butyl acetate, butyl benzoate, ethylene glycol monobutyl ether acetate, and diethylene glycol monobutyl ether acetate. The carboxylic acid is preferably a carboxylic acid having a hydroxyl group, more preferably lactic acid, citric acid or malic acid form the viewpoint of an improvement in the final mold strength and a decrease in smell.

In the mixed sand composition, the ratio of the refractory particles, the binder composition, and the hardener may be appropriately set. Preferably, the amount of the binder composition and that of the hardener ranges from 0.5 to 1.5 parts by weight and from 0.07 to 1 part by weight, respectively, for 100 parts by weight of the refractory particles. Such a ratio easily provides a sufficiently strong foundry mold. Furthermore, the addition amount of the hardener is preferably from 10 to 40 parts by weight, more preferably from 15 to 35 parts by weight for 100 parts by weight of the furan resin in the binder composition from the viewpoint of making the water amount contained in the foundry mold as little as possible, and the efficiency of the mixing in a mixer.

The composition for making self-hardening foundry molds of the present invention contains the binder composition for making self-hardening foundry molds, the refractory particles, and the acidic hardener. Preferably, the composition for making self-hardening foundry molds of the present invention contains 0.5 to 1.5 parts by weight of the binder composition for making self-hardening foundry molds and 0.07 to 1 part by weight of the hardener for 100 parts by weight of the refractory particles. Preferred aspects of the refractory particles, the acidic hardener and some other are as described above.

The binder composition for making self-hardening foundry molds of the present invention is used suitably for producing a foundry mold.

The composition of the present invention is:

<1> a binder composition for making self-hardening foundry molds, comprising a furan resin and an ion compound, wherein the ion compound contains at least one anion selected from the group consisting of a hydrogensulfite ion, a sulfite ion, a pyrosulfite ion, a thiosulfate ion, a thionate ion, and a dithionite ion; the content of the anion is from 0.006 to 0.60 parts by weight for 100 parts by weight of the furan resin; and the composition has a pH of 6 or less at 25° C.

The present invention is preferably a composition, producing method or use described below.

<2> The binder composition for making self-hardening foundry molds according to <1>, wherein a cation in the ion compound is a metal ion of one or more elements selected from the group consisting of elements in Groups 1, 2 and 12 of the periodic table, preferably a metal ion of one or more elements selected from the group consisting of elements in Groups 1 and 2 of the periodic table, more preferably a metal ion of one or more elements selected from the group consisting of elements in Group 1 of the periodic table.

<3> The binder composition for making self-hardening foundry molds according to <1> or <2>, wherein the anion in the ion compound is one or more selected from the group consisting of a thiosulfate ion, a hydrogensulfite ion and a sulfite ion, preferably one or more selected from the group consisting of a thiosulfate ion and a hydrogensulfite ion, more preferably a thiosulfate ion.

<4> The binder composition for making self-hardening foundry molds according to any one of <1> to <3>, wherein the cation of the ion compound is one or more selected from the group consisting of Na ion, K ion, Mg ion, Ca ion and Zn ion, preferably one or more selected from the group consisting of Na ion and K ion, more preferably Na ion.

<5> The binder composition for making self-hardening foundry molds according to any one of <1> to <4>, wherein the ion compound is one or more selected from the group consisting of sodium hydrogensulfite, potassium hydrogensulfite, sodium sulfite, sodium thiosulfate, potassium thiosulfate, magnesium thiosulfate, calcium thiosulfate, sodium tetrathionate, and sodium dithionite, preferably one or more selected from the group consisting of sodium hydrogensulfite, potassium hydrogensulfite, sodium sulfite, sodium thiosulfate, potassium thiosulfate, magnesium thiosulfate, and calcium thiosulfate, more preferably one or more selected from the group consisting of sodium thiosulfate, potassium thiosulfate, magnesium thiosulfate, and calcium thiosulfate.

<6> The binder composition for making self-hardening foundry molds according to any one of <1> to <5>, wherein the content of the anion is 0.009 parts or more by weight, preferably 0.02 parts or more by weight, more preferably 0.03 parts or more by weight for 100 parts by weight of the furan resin effective content, and is 0.50 parts or less by weight, preferably 0.20 parts or less by weight, more preferably 0.10 parts or less by weight therefor.

<7> The binder composition for making self-hardening foundry molds according to any one of <1> to <6>, wherein the content by percentage of the anion of the ion compound in the binder composition is 0.006% or more by weight, preferably 0.008% or more by weight, more preferably 0.03% or more by weight, even more preferably 0.05% or more by weight, and is 0.54% or less by weight, preferably 0.50% or less by weight, more preferably 0.40% or less by weight, even more preferably 0.20% or less by weight.

<8> The binder composition for making self-hardening foundry molds according to any one of <1> to <7>, wherein the content by percentage of the ion compound in the binder composition is 0.005% or more by weight, preferably 0.01% or more by weight of the binder composition, and is 2.0% or less by weight, preferably 1.0% or less by weight.

<9> The binder composition for making self-hardening foundry molds according to any one of <1> to <8>, wherein the pH of the furan resin at 25° C. is less than 7, preferably 6 or less, more preferably 5.5 or less, even more preferably 5 or less, and is 1.9 or more, preferably 2.5 or more, more preferably 3 or more.

<10> The binder composition for making self-hardening foundry molds according to any one of <1> to <9>, wherein the furan resin is a resin synthesized, using an acidic catalyst having a pKa of 5.0 or less, preferably from 1.9 to 5.0, more preferably from 3.0 to 4.5.

<11> The binder composition for making self-hardening foundry molds according to any one of <1> to <10>, wherein the acidic catalyst is one or more selected from the group consisting of sulfuric acid, phosphoric acid, benzenesulfonic acid, p-toluenesulfonic acid, xylenesulfonic acid, methanesulfonic acid, tartaric acid, citric acid, malic acid, glycolic acid, lactic acid, benzoic acid, and formic acid, preferably one or more selected from the group consisting of benzoic acid and formic acid.

<12> The binder composition for making self-hardening foundry molds according to any one of <1> to <11>, wherein the content by percentage of free furfuryl alcohol in the furan resin is from 20 to 98% by weight, preferably from 20 to 95% by weight, more preferably from 20 to 80% by weight, even more preferably from 30 to 75% by weight, even more preferably from 35 to 65% by weight.

<13> The binder composition for making self-hardening foundry molds according to any one of <1> to <12>, wherein the content by percentage of furfuryl alcohol in the binder composition is 20% or more by weight, preferably 45% or more by weight, more preferably 60% or more by weight, even more preferably 70% or more by weight, and is 98% or less by weight, preferably 95% or less by weight, more preferably 90% or less by weight.

<14> The binder composition for making self-hardening foundry molds according to any one of <1> to <13>, wherein the water content by percentage in the furan resin is 30% or less by weight, preferably 25% or less by weight, more preferably 20% or less by weight, and the water content by percentage in the furan resin is 3.0% or more by weight, preferably more than 6.0% by weight, more preferably 10% or more by weight.

<15> The binder composition for making self-hardening foundry molds according to any one of <1> to <14>, wherein the content by percentage of the furan resin (furan resin effective content) is 50% or more by weight, preferably 55% or more by weight, more preferably 60% or more by weight, even more preferably 70% or more by weight, and is 99% or less by weight, preferably 95% or less by weight, more preferably 90% or less by weight.

<16> The binder composition for making self-hardening foundry molds according to any one of <1> to <15>, wherein the water content by percentage in the binder composition is 30.0% or less by weight, preferably 25.0% or less by weight, more preferably 20.0% or less by weight, and is more than 6.0% by weight, preferably 10% or more by weight, more preferably 15% or more by weight, even more preferably 20% or more by weight.

<17> The binder composition for making self-hardening foundry molds according to any one of <1> to <16>, which has a pH of 5.8 or less, preferably 5.6 or less, and 2 or more, preferably 3 or more, more preferably 4 or more at 25° C.

<18> The binder composition for making self-hardening foundry molds according to any one of <1> to <17>, further comprising one or more selected from the group consisting of 2,5-bishydroxymethylfuran, 2,5-bismethoxymethylfuran, 2,5-bisethoxymethylfuran, 2-hydroxymethyl-5-methoxymethylfuran, 2-hydroxymethyl-5-ethoxymethylfuran and 2-methoxymethyl-5-ethoxymethylfuran, preferably 2,5-bishydroxymethylfuran.

19> A composition for making self-hardening foundry molds, comprising the binder composition for making self-hardening foundry molds recited in any one of <1> to <18>, refractory particles, and an acidic hardener, wherein the composition preferably contains 0.5 to 1.5 parts by weight of the binder composition for making self-hardening foundry molds, and 0.07 to 1 part by weight of the hardener for 100 parts by weight of the refractory particles.

<20> Use of the binder composition for making self-hardening foundry molds recited in any one of <1> to <18> for producing a foundry mold.

<21> A method for producing a foundry mold, comprising the steps of mixing the binder composition for making self-hardening foundry molds recited in any one of <1> to <18>, refractory particles, and an acidic hardener with each other to yield a composition for making self-hardening foundry molds, and hardening the mixture.

Hereinafter, a description will be made about working examples demonstrating the present invention specifically, and others.

Examples 1 to 26 and Comparative Examples 1 to 17

A furan resin A and an ion compound were used, and one out of compositions shown in Tables 1 to 4 was kneaded to prepare each binder composition. Thereafter, each mixed sand composition was prepared by a preparing method described below. About the resultant mixed sand composition, the mold strength thereof was evaluated after 1 hour and 24 hours by an evaluation method described below. The results are shown in Tables 1 to 4. The furan resin A contained in the binder composition having each of the compositions shown in Tables 1 to 4 was a resin obtained, using benzoic acid (pKa: 4.20) as an acidic catalyst. The ratio by mole between the monomers and the acidic catalyst used when the resin was synthesized was as follows: the entire monomers:acidic catalyst=1:0.01. The monomers used were furfuryl alcohol, formaldehyde and urea, and the ratio by mole of furfuryl alcohol/formaldehyde/urea was 2.5/3.6/1. In each of the Examples 1 to 26, and Comparative Examples 1 to 17, a silane coupling agent [N-β-(aminoethyl)-γ-aminopropylmethyldimethoxysilane] was added to the binder composition to give a concentration of 0.1% by weight. In Comparative Example 1, a 48% sodium hydroxide solution in water was added as a pH adjustor to the binder composition to give a concentration of 1.4% by weight. The pH of each of the binder compositions, or the furan resin was a value obtained by mixing water with the binder composition or the furan resin to give a ratio by weight of 50/50, stirring the resultant system, and then making a measurement at 25° C.

Properties of the furan resin A were as follows:
<Properties of Furan Resin A>
Free furfuryl alcohol=60% by weight
Furfuryl alcohol/urea formaldehyde resin=24.0% by weight
Nitrogen content by percentage=2.5% by weight
Water content by percentage=16% by weight
pH=4.5 (at 25° C.)
Viscosity=38 mPa·s at 25° C. (measuring conditions: 60 rpm according to a B type viscometer using a rotor No. 3)

Examples 27 to 34 and Comparative Examples 18 to 22

Use was made of furan resins B, C and D, an ion compound according to the present invention, 2,5-bis(hydroxymethyl)furan, and a silane coupling agent [N-β-(aminoethyl)-γ-aminopropylmethyldimethoxysilane] to prepare binder compositions each having composition shown in Tables 5 to 7. Thereafter, each mixed sand composition was yielded in the same way as in Example 1. The mold strength thereof was measured after 1 hour and after 24 hours. The results are shown in Tables 5 to 7. The furan resins B, C and D contained in the respective binder compositions having the compositions shown in Tables 5 to 7 were each a resin obtained by mixing a furan resin U described below with furfuryl alcohol and water at a ratio shown below. Formaldehyde and urea were allowed to react with each other in water in the presence of sodium hydroxide as a basic catalyst. The ratio of the total mole number of formaldehyde and urea to the mole number of the basic catalyst was 1:0.0002. Furthermore, furfuryl alcohol was added thereto, and the resultant was adjusted into a pH of 4.5 with formic acid (pKa: 3.55). The monomers were then allowed to react with each other, and then the system was heated until the internal temperature turned to 150° C. Under normal pressure, the resultant was concentrated to yield a furan resin U (urea formaldehyde modified furan resin). The ratio by mole between the monomers and the acidic catalyst used when the resin was synthesized was as follows: the entire monomers: acidic catalyst=1:0.0036. The monomers used were furfuryl alcohol, formaldehyde and urea, and the ratio by mole of furfuryl alcohol/formaldehyde/urea was 2.6/2.1/1.

The furan resin B was yielded by blending 30.7 g of the furan resin U, 52.3 g of furfuryl alcohol, and 17.0 g of water with each other. Similarly, the furan C was yielded by blending 44.9 g of the furan resin U, 28.5 g of furfuryl alcohol, and 26.6 g of water with each other. Furthermore, the furan resin D was yielded by blending 9.7 g of the furan resin U, 87.3 g of furfuryl alcohol, and 3.0 g of water with each other.

In each of Examples 29 and 30, and Comparative Example 18, a 48% sodium hydroxide solution in water was used as a pH adjustor to adjust the composition to have a pH shown in Table 5. The pH of each of the binder compositions, or each of the furan resins was a value obtained by mixing water with the binder composition or the furan resin to give a ratio by weight of 50/50, stirring the resultant system, and then making a measurement at 25° C.

Properties of the furan resins B, C and D were as follows:
<Properties of Furan Resin B>
Free furfuryl alcohol=63.4% by weight
Furfuryl alcohol/urea formaldehyde resin=18.8% by weight
Nitrogen content by percentage=2.6% by weight
Water content by percentage=17.8% by weight
pH=4.5 (at 25° C.)
Viscosity=9.9 mPa·s at 25° C. (measuring conditions: 60 rpm according to a B type viscometer using a rotor No. 3)
<Properties of Furan Resin C>
Free furfuryl alcohol=44.7% by weight
Furfuryl alcohol/urea formaldehyde resin=27.5% by weight
Nitrogen content by percentage=3.8% by weight
Water content by percentage=27.8% by weight
pH=4.6 (at 25° C.)
Viscosity=14.1 mPa·s at 25° C. (measuring conditions: 60 rpm according to a B type viscometer using a rotor No. 3)
<Properties of Furan Resin D>
Free furfuryl alcohol=90.8% by weight
Furfuryl alcohol/urea formaldehyde resin=5.9% by weight
Nitrogen content by percentage=0.8% by weight
Water content by percentage=3.3% by weight
pH=4.5 (at 25° C.)
Viscosity=6.5 mPa·s at 25° C. (measuring conditions: 60 rpm according to a B type viscometer using a rotor No. 3)
<Method for Preparing Mixed Sand Composition>

In an atmosphere at 25° C. and 55% RH, 8.0 parts by weight of a mixture of xylenesulfonic-acid/sulfuric-acid based hardeners [aqueous 55.4% by weight solution of a mixture of a KAOLIGHTNER hardener US-3 manufactured by Kao-Quaker Co., Ltd., and a KAOLIGHTNER hardener C-21 manufactured by Kao-Quaker Co., Ltd. (the ratio by weight of the US-3/the C-21=12/28)] was added to 2000 parts by weight of Fremantle new sand (manufactured by Yamakawa Sangyo Co., Ltd.). Next, thereto was added 20.0 parts by weight of each of the binder compositions prepared as described above, and these components were mixed with each other to yield each mixed sand composition.
<Method for Evaluating Respective Mold Strengths after 1 Hour and After 24 Hours>

In an atmosphere at 25° C. and 55% RH, each of the mixed sand compositions immediately after the mixing was filled into a test piece pattern in the form of a column having a diameter of 50 mm and a height of 50 mm. Next, the composition was allowed to stand still at 25° C. and 55% RH. After one hour from the filling, the compression strength was measured. The resultant value was defined as the "mold strength after 1 hour". Subsequently, when five hours elapsed, the composition was stripped from the pattern. Furthermore, after the stripping, the composition was allowed to stand still at 25° C. and 55% RH for 19 hours, and then the compression strength was measured. The resultant value was defined as the "mold strength after 24 hours". The compression strengths were measured by the method in accordance with JIS Z 2604-1976.
<Solubility of Additives after Two Months at 35° C.>

In order to verify the respective solubilities of the additives of each of the binder compositions shown in Tables 2 to 4, the binder composition was shifted to a transparent vessel, and then allowed to stand still at 35° C. for 2 months. The respective solubilities of the additives were then verified. The results are shown in Tables 2 to 4.

TABLE 1

| Examples and Comparative Examples | Furan resin A added amount (% by weight) | Ion compound | Ion compound added amount (% by weight) | Binder composition pH | Water content by percentage (% by weight) in binder composition | Ion compound Anion species |
|---|---|---|---|---|---|---|
| Example 1 | 99.808 | Na hydrogensulfite | 0.092 | 4.4 | 16.0 | Hydrogensulfite ion |
| Example 2 | 99.794 | K hydrogensulfite | 0.106 | 4.4 | 16.0 | Hydrogensulfite ion |
| Example 3 | 99.788 | Na sulfite | 0.112 | 5.1 | 16.0 | Sulfite ion |
| Example 4 | 99.759 | K sulfite | 0.141 | 5.3 | 16.0 | Sulfite ion |
| Example 5 | 99.739 | Mg sulfite 6$H_2$O | 0.161 | 4.6 | 16.1 | Sulfite ion |
| Example 6 | 99.785 | Ca sulfite 0.5$H_2$O | 0.115 | 4.6 | 16.0 | Sulfite ion |
| Example 7 | 99.738 | Zn sulfite 2$H_2$O | 0.162 | 4.5 | 16.0 | Sulfite ion |
| Example 8 | 99.790 | K pyrosulfite | 0.110 | 4.4 | 16.0 | Pyrosulfite ion |
| Example 9 | 99.799 | Na thiosulfate | 0.101 | 4.8 | 16.0 | Thiosulfate ion |
| Example 10 | 99.779 | K thiosulfate | 0.121 | 4.8 | 16.0 | Thiosulfate ion |
| Example 11 | 99.744 | Mg thiosulfate | 0.156 | 4.7 | 16.0 | Thiosulfate ion |
| Example 12 | 99.805 | Ca thiosulfate | 0.095 | 4.7 | 16.0 | Thiosulfate ion |

TABLE 1-continued

| Examples and Comparative Examples | | | | | | |
|---|---|---|---|---|---|---|
| Example 13 | 99.802 | Na tetrathionate 2H$_2$O | 0.098 | 4.7 | 16.0 | Thionate ion |
| Example 14 | 99.803 | Na dithionite 2H$_2$O | 0.097 | 4.7 | 16.0 | Dithionite ion |
| Comparative Example 1 | 98.600 | None | 0.000 | 8.5 | 16.5 | None |
| Comparative Example 2 | 99.900 | None | 0.000 | 4.5 | 16.0 | None |
| Comparative Example 3 | 99.793 | Na nitrite | 0.107 | 4.7 | 16.0 | Nitrite ion |
| Comparative Example 4 | 99.830 | Dicyclohexylamine | 0.070 | 5.0 | 16.0 | Nonionic |
| Comparative Example 5 | 99.830 | Thiourea | 0.070 | 4.7 | 16.0 | Nonionic |
| Comparative Example 6 | 99.746 | 53% cobalt naphthenate | 0.154 | 4.5 | 16.0 | Naphthenate ion |
| Comparative Example 7 | 99.794 | Sodium sulfate | 0.106 | 4.5 | 16.0 | Sulfate ion |
| Comparative Example 8 | 99.802 | Sodium nitrate | 0.098 | 4.5 | 16.0 | Nitrate ion |

| Examples and Comparative Examples | Ion compound | | Content (part by weight) of anion of ion compound for 100 parts by weight of furan resin | Mold strength (MPa) | |
|---|---|---|---|---|---|
| | Anion concentration (% by weight) in binder composition | Cation species | | After 1 hour | After 24 hours |
| Example 1 | 0.070 | Na | 0.083 | 1.55 | 4.51 |
| Example 2 | 0.070 | K | 0.083 | 1.50 | 4.50 |
| Example 3 | 0.070 | Na | 0.083 | 1.52 | 4.35 |
| Example 4 | 0.070 | K | 0.083 | 1.43 | 4.33 |
| Example 5 | 0.070 | Mg | 0.083 | 1.41 | 4.35 |
| Example 6 | 0.070 | Ca | 0.083 | 1.43 | 4.33 |
| Example 7 | 0.070 | Zn | 0.083 | 1.40 | 4.30 |
| Example 8 | 0.070 | K | 0.083 | 1.43 | 4.40 |
| Example 9 | 0.070 | Na | 0.083 | 1.60 | 4.53 |
| Example 10 | 0.070 | K | 0.083 | 1.58 | 4.50 |
| Example 11 | 0.070 | Mg | 0.083 | 1.58 | 4.45 |
| Example 12 | 0.070 | Ca | 0.083 | 1.60 | 4.45 |
| Example 13 | 0.070 | Na | 0.083 | 1.45 | 4.45 |
| Example 14 | 0.070 | Na | 0.083 | 1.48 | 4.42 |
| Comparative Example 1 | 0.000 | — | 0.000 | 0.98 | 3.80 |
| Comparative Example 2 | 0.000 | — | 0.000 | 1.24 | 3.94 |
| Comparative Example 3 | 0.070 | Na | 0.083 | 1.25 | 3.71 |
| Comparative Example 4 | 0.000 | — | 0.000 | 1.03 | 3.96 |
| Comparative Example 5 | 0.000 | — | 0.000 | 1.05 | 3.99 |
| Comparative Example 6 | 0.070 | Co | 0.083 | 1.15 | 3.82 |
| Comparative Example 7 | 0.070 | Na | 0.083 | 1.10 | 3.85 |
| Comparative Example 8 | 0.070 | Na | 0.083 | 1.30 | 3.85 |

As shown in Table 1, Examples 1 to 14 were higher in the respective mold strengths after 1 hour and after 24 hours than Comparative Examples 1 to 8. Thus, it is evident that the former examples were improved in mold productivity.

TABLE 2

| Examples and Comparative Examples | Binder composition | | | | | |
|---|---|---|---|---|---|---|
| | Furan resin A added amount (% by weight) | Ion compound | Ion compound added amount (% by weight) | Binder composition pH | Water content by percentage (% by weight) in binder composition | Ion compound Anion species |
| Example 15 | 99.890 | Na hydrogensulfite | 0.010 | 4.4 | 16.0 | Hydrogensulfite ion |
| Example 16 | 99.850 | Na hydrogensulfite | 0.050 | 4.4 | 16.0 | Hydrogensulfite ion |
| Example 1 | 99.808 | Na hydrogensulfite | 0.092 | 4.4 | 15.9 | Hydrogensulfite ion |
| Example 17 | 99.400 | Na hydrogensulfite | 0.500 | 4.3 | 15.9 | Hydrogensulfite ion |
| Example 18 | 99.301 | Na hydrogensulfite | 0.599 | 4.3 | 15.9 | Hydrogensulfite ion |

TABLE 2-continued

| | | | | | | |
|---|---|---|---|---|---|---|
| Comparative Example 9 | 99.895 | Na hydrogensulfite | 0.005 | 4.5 | 16.0 | Hydrogensulfite ion |
| Comparative Example 10 | 99.180 | Na hydrogensulfite | 0.720 | 4.3 | 15.8 | Hydrogensulfite ion |
| Comparative Example 11 | 98.900 | Na hydrogensulfite | 1.000 | 4.3 | 15.8 | Hydrogensulfite ion |

| Examples and Comparative Examples | Ion compound Anion concentration (% by weight) in binder composition | Cation species | Content (part by weight) of anion of ion compound for 100 parts by weight of furan resin | Mold strength (MPa) After 1 hour | Mold strength (MPa) After 24 hours | Solubility of Na hydrogensulfite (standing-still at 35° C. for 2 months) |
|---|---|---|---|---|---|---|
| Example 15 | 0.008 | Na | 0.010 | 1.50 | 4.10 | Soluble |
| Example 16 | 0.038 | Na | 0.045 | 1.60 | 4.40 | Soluble |
| Example 1 | 0.070 | Na | 0.083 | 1.55 | 4.51 | Soluble |
| Example 17 | 0.382 | Na | 0.457 | 1.43 | 4.45 | Soluble |
| Example 18 | 0.458 | Na | 0.549 | 1.43 | 4.40 | Soluble |
| Comparative Example 9 | 0.004 | Na | 0.005 | 1.30 | 3.95 | Soluble |
| Comparative Example 10 | 0.550 | Na | 0.660 | 1.43 | 4.25 | Partially insoluble |
| Comparative Example 11 | 0.764 | Na | 0.919 | 1.43 | 3.99 | Partially insoluble |

As shown in Table 2, Examples 15, 16, 1, 17 and 18 were higher in the respective mold strengths after 1 hour and after 24 hours than Comparative Examples 9, 10 and 11. Thus, it is evident that the former examples were improved in mold productivity. It is evident that Examples 15, 16, 1, 17 and 18 had no problem of solubility of their ion compound. However, in Comparative Examples 10 and 11, their ion compound was partially insoluble.

TABLE 3

| Examples and Comparative Examples | Binder composition Furan resin A added amount (% by weight) | Ion compound | Ion compound added amount (% by weight) | Binder composition pH | Water content by percentage (% by weight) in binder composition | Ion compound Anion species |
|---|---|---|---|---|---|---|
| Example 19 | 99.883 | Na thiosulfate pentahydrate | 0.017 | 4.5 | 16.0 | Thiosulfate ion |
| Example 20 | 99.814 | Na thiosulfate pentahydrate | 0.086 | 4.7 | 16.0 | Thiosulfate ion |
| Example 9 | 99.742 | Na thiosulfate pentahydrate | 0.158 | 4.8 | 16.1 | Thiosulfate ion |
| Example 21 | 99.038 | Na thiosulfate pentahydrate | 0.862 | 5.1 | 16.2 | Thiosulfate ion |
| Example 22 | 98.900 | Na thiosulfate pentahydrate | 1.000 | 5.1 | 16.4 | Thiosulfate ion |
| Comparative Example 12 | 99.891 | Na thiosulfate pentahydrate | 0.009 | 4.5 | 16.0 | Thiosulfate ion |
| Comparative Example 13 | 98.400 | Na thiosulfate pentahydrate | 1.500 | 5.7 | 16.6 | Thiosulfate ion |
| Comparative Example 14 | 98.176 | Na thiosulfate pentahydrate | 1.724 | 6.0 | 16.3 | Thiosulfate ion |

| Examples and Comparative Examples | Ion compound Anion concentration (% by weight) in binder composition | Cation species | Content (part by weight) of anion of ion compound for 100 parts by weight of furan resin | Mold strength (MPa) after 1 hour | Mold strength (MPa) After 24 hours | Solubility of Na thiosulfate (standing-still at 35° C. for 2 months) |
|---|---|---|---|---|---|---|
| Example 19 | 0.008 | Na | 0.009 | 1.55 | 4.42 | Soluble |
| Example 20 | 0.038 | Na | 0.045 | 1.60 | 4.45 | Soluble |
| Example 9 | 0.070 | Na | 0.083 | 1.60 | 4.53 | Soluble |
| Example 21 | 0.382 | Na | 0.458 | 1.50 | 4.45 | Soluble |
| Example 22 | 0.443 | Na | 0.533 | 1.48 | 4.45 | Soluble |
| Comparative Example 12 | 0.004 | Na | 0.005 | 1.50 | 4.30 | Soluble |

TABLE 3-continued

| | | | | | | |
|---|---|---|---|---|---|---|
| Comparative Example 13 | 0.665 | Na | 0.804 | 1.45 | 4.35 | Partially insoluble |
| Comparative Example 14 | 0.764 | Na | 0.925 | 1.43 | 4.30 | Partially insoluble |

As shown in Table 3, Examples 19, 20, 9, 21 and 22 were higher in the respective mold strengths after 1 hour and after 24 hours than Comparative Examples 12, 13, and 14. Thus, it is evident that the former examples were improved in mold productivity. It is evident that Examples 19, 20, 9, 21 and 22 had no problem of solubility of their ion compound. However, in Comparative Examples 13 and 14, their ion compound was partially insoluble.

TABLE 4

| | Binder composition | | | | | |
|---|---|---|---|---|---|---|
| Examples and Comparative Examples | Furan resin A added amount (% by weight) | Ion compound | Ion compound added amount (% by weight) | Binder composition pH | Water content by percentage (% by weight) in binder composition | Ion compound Anion species |
| Example 23 | 99.888 | Na sulfite | 0.012 | 4.9 | 16.0 | Sulfite ion |
| Example 24 | 99.850 | Na sulfite | 0.050 | 5.0 | 16.0 | Sulfite ion |
| Example 3 | 99.788 | Na sulfite | 0.112 | 5.1 | 16.0 | Sulfite ion |
| Example 25 | 99.400 | Na sulfite | 0.500 | 5.4 | 15.9 | Sulfite ion |
| Example 26 | 99.311 | Na sulfite | 0.589 | 5.6 | 15.9 | Sulfite ion |
| Comparative Example 15 | 99.895 | Na sulfite | 0.005 | 4.7 | 16.0 | Sulfite ion |
| Comparative Example 16 | 99.049 | Na sulfite | 0.851 | 5.8 | 15.8 | Sulfite ion |
| Comparative Example 17 | 98.900 | Na sulfite | 1.000 | 5.8 | 15.8 | Sulfite ion |

| | Ion compound | | Content | | | |
|---|---|---|---|---|---|---|
| Examples and Comparative Examples | Anion concentration (% by weight) in binder composition | Cation species | (part by weight) of anion of ion compound for 100 parts by weight of furan resin | Mold strength (MPa) After 1 hour | After 24 hours | Solubility of Na sulfite (standing-still at 35° C. for 2 months) |
| Example 23 | 0.008 | Na | 0.009 | 1.50 | 4.36 | Soluble |
| Example 24 | 0.038 | Na | 0.045 | 1.55 | 4.45 | Soluble |
| Example 3 | 0.070 | Na | 0.083 | 1.52 | 4.35 | Soluble |
| Example 25 | 0.382 | Na | 0.457 | 1.50 | 4.45 | Soluble |
| Example 26 | 0.450 | Na | 0.539 | 1.46 | 4.40 | Soluble |
| Comparative Example 15 | 0.004 | Na | 0.005 | 1.38 | 4.30 | Soluble |
| Comparative Example 16 | 0.650 | Na | 0.780 | 1.44 | 4.35 | Partially insoluble |
| Comparative Example 17 | 0.764 | Na | 0.918 | 1.43 | 4.30 | Partially insoluble |

As shown in Table 4, Examples 23, 24, 3, 25 and 26 were higher in the respective mold strengths after 1 hour and after 24 hours than Comparative Examples 15, 16 and 17. Thus, it is evident that the former examples were improved in mold productivity. It is evident that Examples 23, 24, 3, 25 and 26 had no problem of solubility of their ion compound. However, in Comparative Examples 16 and 17, their ion compound was partially insoluble.

TABLE 5

| | Binder composition | | | | | | | |
|---|---|---|---|---|---|---|---|---|
| Examples and Comparative Examples | Furan resin | Furan resin added amount (% by weight) | Na thiosulfate added amount (% by weight) | 2,5-Bis (hydroxymethyl) furan added amount (% by weight) | Silane coupling agent (% by weight) | Binder composition pH | Water content by percentage (% by weight) in binder composition | Ion compound Anion species |
| Example 27 | B | 89.799 | 0.101 | 10.000 | 0.100 | 4.6 | 17.9 | Thiosulfate ion |
| Example 28 | B | 89.698 | 0.202 | 10.000 | 0.100 | 4.6 | 17.9 | Thiosulfate ion |

TABLE 5-continued

| Example 29 | B | 89.799 | 0.101 | 10.000 | 0.100 | 5.5 | 17.0 | Thiosulfate ion |
| --- | --- | --- | --- | --- | --- | --- | --- | --- |
| Example 30 | B | 89.698 | 0.202 | 10.000 | 0.100 | 5.6 | 17.1 | Thiosulfate ion |
| Comparative Example 18 | B | 89.799 | 0.101 | 10.000 | 0.100 | 6.6 | 18.0 | Thiosulfate ion |
| Comparative Example 19 | B | 89.900 | 0.000 | 10.000 | 0.100 | 4.5 | 17.5 | None |
| Comparative Example 20 | B | 89.900 | 0.000 | 10.000 | 0.100 | 5.5 | 16.8 | None |

| Examples and Comparative Examples | Ion compound | | Content (part by weight) of anion of ion compound for 100 parts by weight of furan resin | Mold strength (MPa) | |
| --- | --- | --- | --- | --- | --- |
| | Anion concentration (% by weight) in binder composition | Cation species | | After 1 hour | After 24 hours |
| Example 27 | 0.070 | Na | 0.095 | 0.64 | 4.44 |
| Example 28 | 0.140 | Na | 0.190 | 0.67 | 4.15 |
| Example 29 | 0.070 | Na | 0.095 | 0.52 | 4.19 |
| Example 30 | 0.140 | Na | 0.190 | 0.60 | 4.34 |
| Comparative Example 18 | 0.070 | Na | 0.095 | 0.50 | 3.95 |
| Comparative Example 19 | 0.000 | — | 0.000 | 0.59 | 4.01 |
| Comparative Example 20 | 0.000 | — | 0.000 | 0.51 | 4.01 |

As shown in Table 5, Examples 27 to 30 were higher in the respective mold strengths after 1 hour and after 24 hours than Comparative Examples 18 to 20. Thus, it is evident that the former examples were improved in mold productivity.

TABLE 6

| Examples and Comparative Examples | Binder composition | | | | | | Ion compound Anion species |
| --- | --- | --- | --- | --- | --- | --- | --- |
| | Furan resin | Furan resin added amount (% by weight) | Na thiosulfate added amount (% by weight) | 2,5-Bis (hydroxymethyl) furan added amount (% by weight) | Silane coupling agent (% by weight) | Binder composition pH | Water content by percentage (% by weight) in binder composition |
| Example 31 | C | 89.799 | 0.101 | 10.000 | 0.100 | 4.6 | 26.0 | Thiosulfate ion |
| Example 32 | C | 89.698 | 0.202 | 10.000 | 0.100 | 4.6 | 25.3 | Thiosulfate ion |
| Comparative Example 21 | C | 89.900 | 0.000 | 10.000 | 0.100 | 4.5 | 25.9 | None |

| Examples and Comparative Examples | Ion compound | | Content (part by weight) of anion of ion compound for 100 parts by weight of furan resin | Mold strength (MPa) | |
| --- | --- | --- | --- | --- | --- |
| | Anion concentration (% by weight) in binder composition | Cation species | | After 1 hour | After 24 hours |
| Example 31 | 0.070 | Na | 0.108 | 0.43 | 3.34 |
| Example 32 | 0.140 | Na | 0.216 | 0.43 | 3.96 |
| Comparative Example 21 | 0.000 | — | 0.000 | 0.40 | 2.71 |

As shown in Table 6, Examples 31 and 32 were higher in the respective mold strength after 1 hour and after 24 hours than Comparative Example 21. Thus, it is evident that the former examples were improved in mold productivity.

sodium hydrogensulfite, potassium hydrogensulfite, sodium sulfite, sodium thiosulfate, potassium thiosulfate, magnesium thiosulfate, calcium thiosulfate, sodium tetrathionate, and sodium dithionite.

TABLE 7

| Examples and Comparative Examples | Furan resin | Binder composition | | | | | | Ion compound Anion species | Ion compound Anion concentration (% by weight) in binder composition | Cation species | Content (part by weight) of anion of ion compound for 100 parts by weight of furan resin | Mold strength (MPa) After 1 hour | Mold strength (MPa) After 24 hours |
|---|---|---|---|---|---|---|---|---|---|---|---|---|---|
| | | Furan resin added amount (% by weight) | Na thiosulfate added amount (% by weight) | 2,5-Bis (hydroxy-methyl) furan added amount (% by weight) | Silane coupling agent (% by weight) | Binder composition pH | Water content by percentage (% by weight) in binder composition | | | | | | |
| Example 33 | D | 89.799 | 0.101 | 10.000 | 0.100 | 4.7 | 5.6 | Thiosulfate ion | 0.070 | Na | 0.081 | 1.26 | 5.24 |
| Example 34 | D | 89.698 | 0.202 | 10.000 | 0.100 | 4.7 | 5.2 | Thiosulfate ion | 0.140 | Na | 0.161 | 0.94 | 4.73 |
| Comparative Example 22 | D | 89.900 | 0.000 | 10.000 | 0.100 | 4.5 | 5.2 | None | 0.000 | — | 0.000 | 0.93 | 4.16 |

As shown in Table 7, Examples 33 and 34 were higher in the respective mold strength after 1 hour and after 24 hours than Comparative Example 22. Thus, it is evident that the former examples were improved in mold productivity.

The invention claimed is:

1. A binder composition for making self-hardening foundry molds, comprising a furan resin and an ion compound, wherein the ion compound contains at least one anion selected from the group consisting of a hydrogensulfite ion, a sulfite ion, a pyrosulfite ion, a thiosulfate ion, a thionate ion, and a dithionite ion; the content of the anion is from 0.006 to 0.60 parts by weight for 100 parts by weight of the furan resin; and the composition has a pH of 6 or less at 25° C.

2. The binder composition for making self-hardening foundry molds according to claim 1, wherein a cation in the ion compound is a metal ion selected from the group consisting of elements in Groups 1, 2 and 12 of the periodic table.

3. The binder composition for making self-hardening foundry molds according to claim 1, wherein the anion in the ion compound is one or more selected from the group consisting of a thiosulfate ion, a hydrogensulfite ion, and a sulfite ion.

4. The binder composition for making self-hardening foundry molds according to claim 1, wherein the cation of the ion compound is one or more selected from the group consisting of Na ion, K ion, Mg ion, Ca ion, and Zn ion.

5. The binder composition for making self-hardening foundry molds according to claim 1, wherein the ion compound is one or more selected from the group consisting of 6. The binder composition for making self-hardening foundry molds according to claim 1, wherein the content of the anion is from 0.009 to 0.50 parts both inclusive by weight for 100 parts by weight of the furan resin effective content.

7. The binder composition for making self-hardening foundry molds according to claim 1, wherein the content by percentage of the anion of the ion compound in the binder composition is from 0.006 to 0.54% both inclusive by weight.

8. The binder composition for making self-hardening foundry molds according to claim 1, wherein the content by percentage of the ion compound in the binder composition is from 0.005 to 2.0% both inclusive by weight.

9. The binder composition for making self-hardening foundry molds according to claim 1, wherein the pH of the furan resin at 25° C. is less than 7.

10. The binder composition for making self-hardening foundry molds according to claim 1, wherein the furan resin is a resin synthesized, using an acidic catalyst having a pKa of 5.0 or less.

11. The binder composition for making self-hardening foundry molds according to claim 10, wherein the acidic catalyst is one or more selected from the group consisting of sulfuric acid, phosphoric acid, benzenesulfonic acid, p-toluenesulfonic acid, xylenesulfonic acid, methanesulfonic acid, tartaric acid, citric acid, malic acid, glycolic acid, lactic acid, benzoic acid, and formic acid.

12. The binder composition for making self-hardening foundry molds according to claim 1, wherein the content by percentage of free furfuryl alcohol in the furan resin is from 20 to 98% by weight.

13. The binder composition for making self-hardening foundry molds according to claim 1, wherein the content by percentage of furfuryl alcohol in the binder composition is from 20% to 98% both inclusive by weight.

14. The binder composition for making self-hardening foundry molds according to claim 1, wherein the water content by percentage in the furan resin is from 3.0 to 30% both inclusive by weight.

15. The binder composition for making self-hardening foundry molds according to claim 1, wherein the content by percentage of the furan resin (furan resin effective content) is from 50 to 99% both inclusive by weight.

16. The binder composition for making self-hardening foundry molds according to claim 1, wherein the water content by percentage is more than 6.0% by weight and 30.0% or less by weight.

17. The binder composition for making self-hardening foundry molds according to claim 1, which has a pH of from 2 to 5.8 both inclusive at 25° C.

18. The binder composition for making self-hardening foundry molds according to claim 1, further comprising one or more selected from the group consisting of 2,5-bishydroxymethylfuran, 2,5-bismethoxymethylfuran, 2,5-bisethoxymethylfuran, 2-hydroxymethyl-5-methoxymethylfuran, 2-hydroxymethyl-5-ethoxymethylfuran, and 2-methoxymethyl-5-ethoxymethylfuran.

19. A composition for making self-hardening foundry molds, comprising the binder composition for making self-hardening foundry molds recited in claim 1, refractory particles, and an acidic hardener.

20. A method for producing a foundry mold, comprising the steps of mixing the binder composition for making self-hardening foundry molds recited in claim 1, refractory particles, and an acidic hardener with each other to yield a composition for making self-hardening foundry molds, and hardening the mixture.

* * * * *